Dec. 20, 1966   L. DAVIS, JR   3,293,438
SIGNAL MIXING DEVICE FOR PRODUCING HIGH FREQUENCY RADIATION
Filed May 24, 1963   2 Sheets-Sheet 1
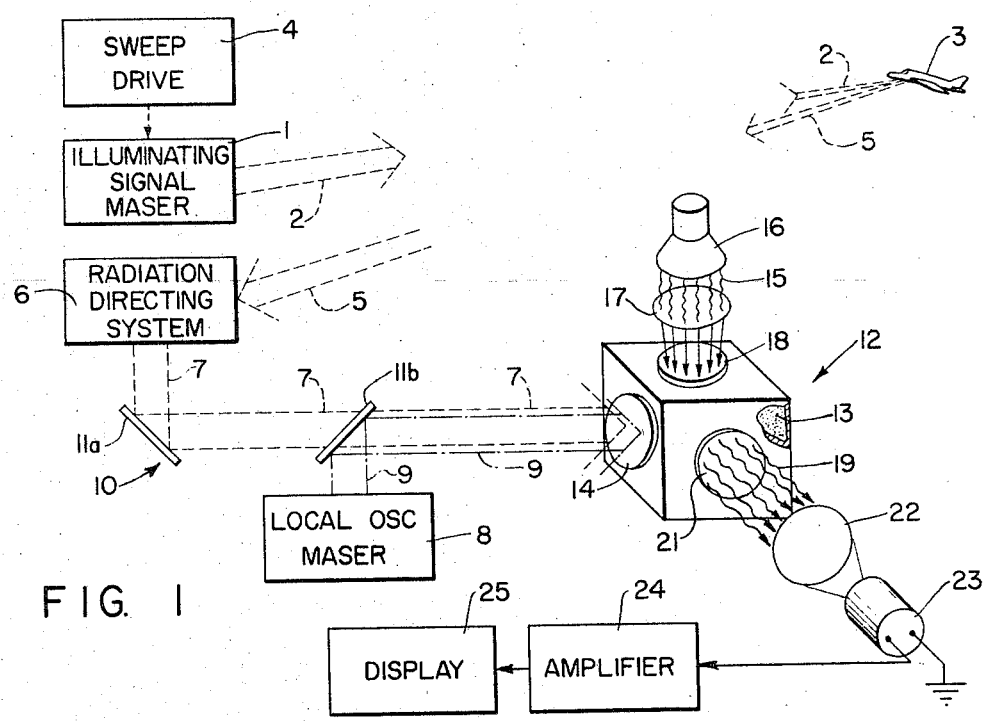
FIG. 1
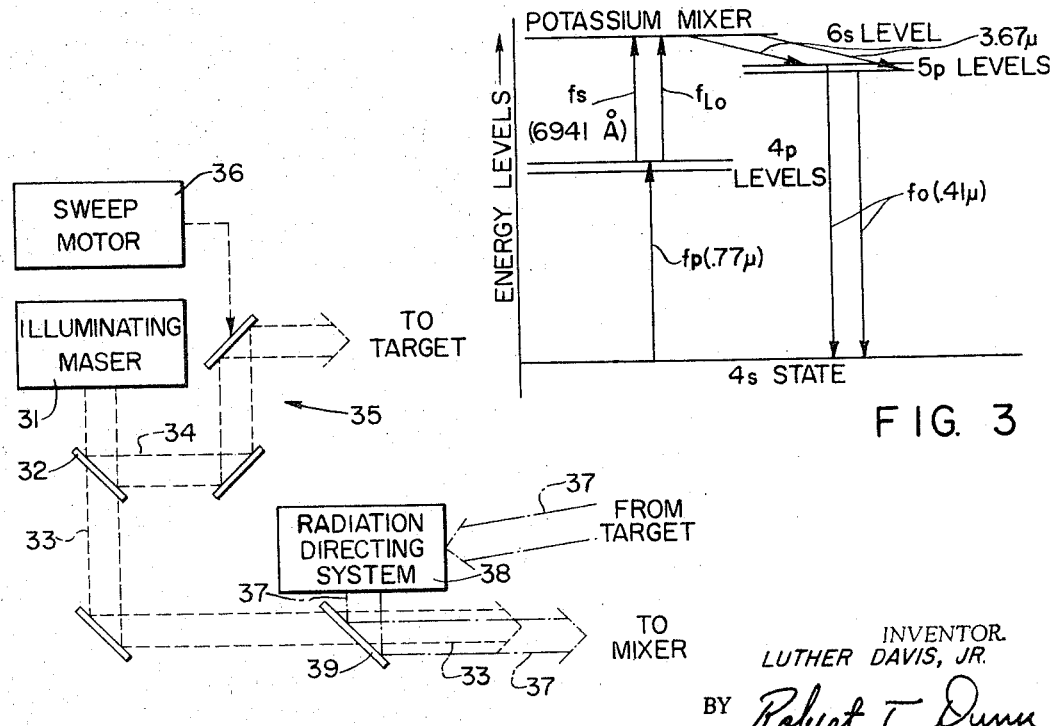
FIG. 2
FIG. 3
INVENTOR.
LUTHER DAVIS, JR.
BY Robert T. Dunn
AGENT Dec. 20, 1966  L. DAVIS, JR  3,293,438
SIGNAL MIXING DEVICE FOR PRODUCING HIGH FREQUENCY RADIATION
Filed May 24, 1963  2 Sheets-Sheet 2
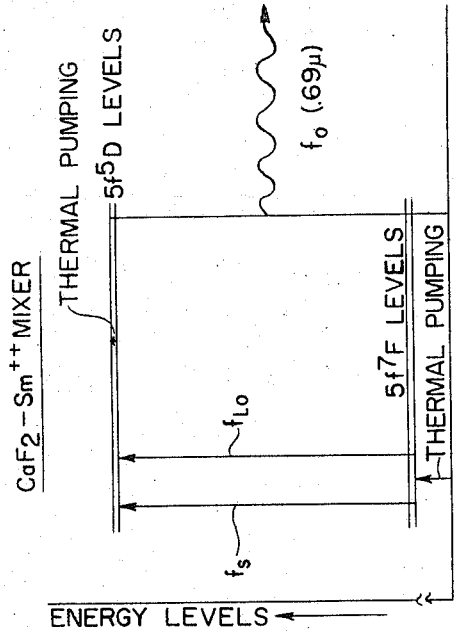
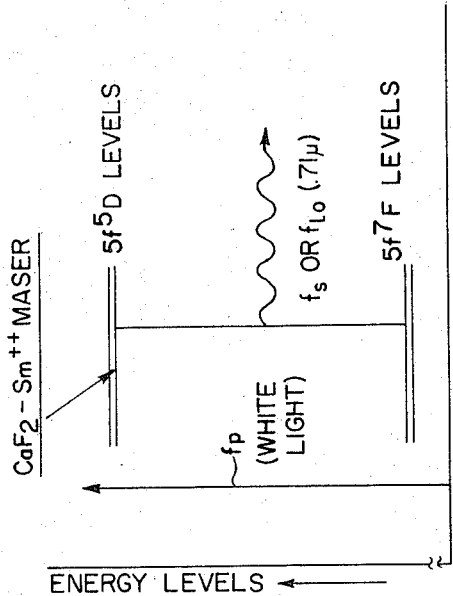
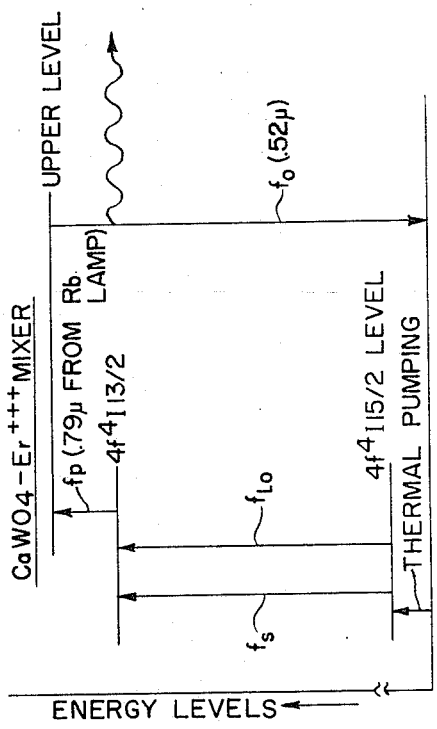
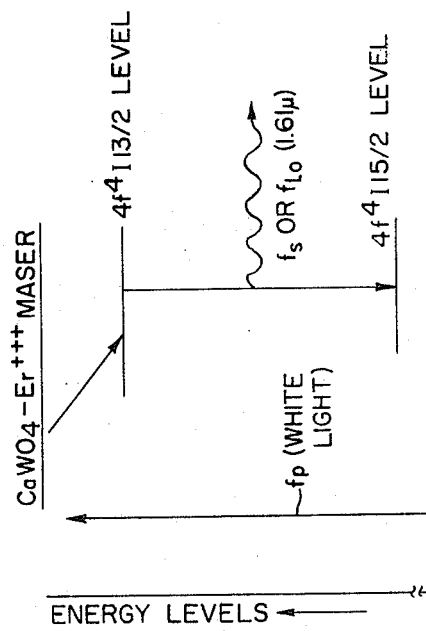
INVENTOR.
LUTHER DAVIS, JR.
BY Robert T. Dunn
AGENT United States Patent Office 3,293,438
Patented Dec. 20, 1966

3,293,438
SIGNAL MIXING DEVICE FOR PRODUCING
HIGH FREQUENCY RADIATION
Luther Davis, Jr., Wayland, Mass., assignor to Raytheon
Company, Lexington, Mass., a corporation of Delaware
Filed May 24, 1963, Ser. No. 282,944
8 Claims. (Cl. 250—199)

The present invention relates to devices for mixing two signals producing a signal representative of the frequency difference between the two signals, and more particularly to means for mixing signals by raising atoms of a selected material to excited energy states.

Heretofore, photons or quanta of radiated energy have been measured by first pumping atoms to an energy state at which the atoms normally do not exist and then exposing these atoms to the photons which are to be counted. The photons raise the atoms to a still higher state, preferably one with an allowed transition to the ground state so that a radiative transition follows, and the atoms drop to the ground state emitting radiation of a particular frequency greater than that of the photons to be counted. The inensity of this radiation is then a measure of the number of photons incident upon the material. It is one object of the present invention to mix two signals by illuminating selected atoms with the signals so that at least one side band will appear in radiation produced by subsequent transition of the atoms to lower energy levels.

It is a feature of the present invention to simultaneously illuminate atoms of a selected material with two different frequency signals either of which causes substantially the same transition between energy levels of the atoms and which do not differ in frequency by substantially more than the inverse natural lifetime of the higher of said energy levels, and to detect radiation from the illuminated atoms which results from a subsequent transition between the energy levels of the atoms and detect in this radiation signals representative of the difference frequency between the two illuminating frequencies.

A specific embodiment of the invention which operates somewhat analogous to a superheterodyne radio receiver includes a signal maser producing a beam of substantially coherent radiation modulated in frequency in accordance with information signals, a local oscillator maser producing unmodulated radiation of substantially the same frequency, means for superimposing radiation beams from each of said masers and means for directing the superimposed beams into a mixing material having atoms at an energy state from which the superimposed radiation raises the energy state of these atoms to a higher state so that later transitions occur accompanied by emission of substantially higher frequency radiation than the maser radiation, and means for detecting intensity modulations of this higher frequency radiation producing a signal representative of the information signals. The term maser herein refers to devices which produce substantially coherent electromagnetic radiation by "molecular amplification of stimulated emission radiation." The term maser as herein used is generic and includes the laser.

In another embodiment for detecting a moving target, only one maser is required. The output from this maser is split into two beams one of which is caused to illuminate a moving target. Reflections from the target are intercepted and superimposed on the other of the two beams and the superimposed beams are directed to the mixing material causing the above-described transitions and eventual emission of radiation whose intensity varies at the rate of the Doppler shift caused by the relative motion of the target.

The illuminating maser (the signal maser) and the material in which the signal mixing occurs must be selected so that the photon energy of the radiation from the signal maser is equivalent to a transition of atoms of the material from a lower to a higher energy state, the relative population of at least one of these states being controlled by energy from a pumping source. Thus, at least three energy levels of atoms of the signal mixing material are employed in the mixing action which produces output radiation which is intensity modulated at the beat frequency. Examples of suitable combinations of a signal maser and mixing material include at least the following: a ruby signal maser of $Al_2O_3$ doped with $Cr^{+++}$ generating 0.69 micron radiation for illuminating potassium vapor as the mixing material which is pumped by radiation from a potassium vapor lamp; a signal master of $CaF_2$ doped with $Sm^{++}$ generating 0.71 micron radiation for illuminating mixing material of $CaF_2$ doped with $Sm^{++}$ which is thermally pumped; a signal maser of $CaWO_4$ doped with $Er^{+++}$ generating 1.61 micron radiation for illuminating mixing material of $CaWO_4$ doped with $Er^{+++}$ which is thermally pumped and also pumped by radiation from a rubidium lamp. These examples are made only by way of example, and other combinations of signal maser materials and mixing material could be employed to achieve the described signal mixing action.

Other features and objects of the invention will be more apparent from the following specific description taken in conjunction with the figures in which:

FIG. 1 illustrates a system for illuminating a moving target with substantially coherent radiation from, for example, a ruby maser and directing reflections from the target parallel with radiation from a second ruby maser into a container of potassium vapor wherein the radiation from the two masers is mixed producing a beat frequency modulation upon the output radiation;

FIG. 2 illustrates another embodiment of the invention wherein coherent radiation from a single ruby maser is split into two beams, one of which is shifted in frequency by, for example, reflection from a moving target, and the two are then combined by raising the energy state of potassium atoms which produce output radiation intensity modulated by the frequency of the shift;

FIG. 3 is an energy level diagram to show the transitions of potassium atoms as a result of illumination by radiation from a ruby signal maser, a ruby local oscillator maser and a source of pump energy, the pump energy serving to raise the energy level of the potassium atoms from ground state to intermediate level;

FIG. 4 is an energy level diagram to show operation of masers of $CaF_2$ doped with divalent $Sm^{++}$ producing signal and local oscillator radiation which are mixed in a mixing material of $CaF_2$ doped with divalent $Sm^{++}$;

FIG. 5 is an energy level diagram to show operation of the $Sm^{++}$ doped mixing material for mixing signal and local oscillator radiation from the $Sm^{++}$ doped maser;

FIG. 6 is an energy level diagram to show operation of masers of $CaWO_4$ doped with $Er^{+++}$ producing signal and local oscillator radiation which are mixed in a mixing material of $CaWO_4$ doped with $Er^{+++}$; and FIG. 7 is an energy level diagram to show operation of the $Er^{+++}$ doped mixing material.

Turning first to FIG. 1 there is shown a system for illuminating a moving target with a signal maser beam and for heterodyning the reflected signal from the targets by mixing with a local oscillator maser beam producing a beat frequency representative of the closing or departing rate of the target relative to the illuminating maser. The system includes an illuminating signal ruby maser 1 which preferably produces a continuous wave of substantially coherent radiation 2 at 0.69 micron which is directed toward a target 3. This radiation is caused to sweep an area of space wherein the target lies by a drive mechanism 4 which physically rotates the maser causing the beam therefrom to sweep the space. Radiation beam 5 reflected from the target is substantially parallel radiation, just as the illuminating beam is parallel radiation and is readily directed by a radiation directing system 6 into a narrow beam 7. A second ruby maser, local oscillator maser 8, which may be of substantially lower power than the illuminating maser 1, and of magnitude to give a large but nonsaturating signal from the photomultiplier 23, also produces a beam of coherent radiation 9 at 0.69 micron.

These frequencies may be absolutely equal, and so the frequency of beam 7 will be different from the frequency of beam 9 only by the Doppler shift which results from the motion of the target 3 relative to the illuminating signal maser 1.

The two beams 7 and 9 of parallel rays are brought into space coincidence by, for example, a mirror system 10 which includes a fully reflective plane mirror 11a of conventional design and a partially reflecting mirror 11b. The mirror 11b is so designed and positioned relative to the two beams 7 and 9 that substantially half the energy of beam 7 is transmitted by the mirror, whereas substantially half the energy of beam 9 is reflected by the mirror. By this structure, the two beams 7 and 9 are brought into space coincidence so that their wave fronts are exactly parallel to each other; that is, they are superimposed upon each other, and as such are directed to a chamber 12 illuminating potassium vapor 13 contained therein which is raised to a higher energy state and which emits radiation modulated at the frequency difference between the two beams 7 and 9.

The beams 7 and 9 are preferably launched into the chamber through an interference filter window 14 which passes only the frequencies of the signal beam 7 and the local oscillator beam 9, but substantially attenuates waves of substantially other frequencies. Such a window might include a quartz disc with coatings on one side of selected dielectric materials, the thickness of these coatings and the materials being chosen to accomplish the above-desired effect. The potassium vapor 13 is also illuminated by radiation 15 from a potassium vapor lamp 16 which is directed by a lens system 17 into the chamber 12 through a second filter window 18 in a direction transverse to beams 7 and 9. The window 18 is designed to pass only the pump frequency of the characteristic potassium line radiation produced by such a lamp but attenuate other frequencies.

The local oscillator frequency, beam 7, herein denoted $f_{lo}$, and the illuminating signal frequency, beam 9, denoted $f_s$ preferably differ by no more than the inverse spontaneous natural lifetime of the higher of the energy levels to which the potassium is raised by $f_s$ and $f_{lo}$. In the case of potassium, this is the inverse spontaneous natural lifetime of the 6s and 5p levels of potassium shown in FIG. 3. The beams 7 and 9 raise the energy level of the potassium vapor atoms from a level to which the atoms have already been pumped by radiation from the potassium vapor lamp 16 of a frequency $f_p$. For example, as shown by the energy level diagram in FIG. 3, the radiation from the potassium vapor lamp $f_p$ at 0.77 micron raises the potassium vapor 13 is the enclosure from the 4s state to the 4p states. Thereafter, the radiation in beams 7 and 9 raises the level of these potassium atoms to the 6s level. From the 6s level, there is a transition to the 5p level and from there to the 4s level with the accompanying emission of frequency $f_o$. This $f_o$ radiation, denoted 19 in FIG. 1, is transmitted through a window filter 21 preferably in a direction transverse to beams 7 and 9 and transverse to radiation from the lamp 16. Window filter 21 preferably transmits only the frequency $f_o$ and attenuates others. The radiation 19 is focused by a lens system 22 upon a photomultiplier tube 23, which detects variations in intensity of the radiation and produces an electric signal corresponding thereto. The electric signal output from the photomultiplier is amplified by an amplifier 24 and applied to a suitable display 25. The display preferably indicates the frequency of this signal as the frequency represents the Doppler shift of the reflected beam from the target 3 and, thus, indicates the velocity of the target relative to the illuminating maser 1.

An explanation of how the frequency difference between the two frequencies $f_s$ and $f_{lo}$ appears as an intensity modulation on output $f_o$ is as follows: The transition probability from the 4p level to the 6s level shown in FIG. 3 depends upon the signal strength as the square of the electric field of the waves $f_s$ and $f_{lo}$ applied thereto. If these two signals are within the natural linewidth of the transition from the 4p to the 6s level, the resulting field E is:

$$E = E_s + E_{lo} = E_s \sin 2\pi f_s t + E_{lo} \cos 2\pi f_{lo} t$$

The probability of this transition has a time dependence which is expressed as follows:

Probability $$\alpha E^2 = E_s^2 \sin{}^2 2\pi f_s t + E_{lo}^2 \cos{}^2 2\pi f_{lo} t \\ + E_s E_{lo} \sin 2\pi (f_{lo} + f_s) t \\ + E_s E_{lo} \sin 2\pi (f_{lo} - f_s) t$$

Thus, the transition probability expressed above has a term which varies as the difference frequency between $f_{lo}$ and $f_s$. It can be shown that as long as the 6s and 5p states of the potassium atom have spontaneous emission lifetimes less than $1/(f_{lo} - f_s)$, the output intensity of $f_o$ will show the same time dependence as this term of the transition probability equation. Thus, there will be produced a signal output with a time varying component of intensity, varying at a frequency equal to the difference frequency between the two superimposed illuminating beams 7 and 9. In the structure shown in FIG. 1, this frequency will represent the velocity of the target 2. If, however, the beam 7 were frequency modulated by an information signal, then the system would serve to heterodyne the modulated beam to obtain the information as is done in an analogous manner in FM communication systems.

Turning next to FIG. 2, there is shown another embodiment of the invention similar to that shown in FIG. 1 for detecting a moving target such as target 3. In FIG. 2, the beam from an illuminating maser 31 which is, for example, a ruby maser emitting 0.69 micron radiation is split by a partially reflecting mirror 32 into two beams 33 and 34. Beam 34 is deflected by a suitable mirror system 35 and directed toward the target. For this purpose, a sweep motor 36 might be employed to cause the beam to sweep an area of space wherein the target is located. Reflections 37 from the target enter a suitable radiation directing system 38 which directs these reflections to a partially reflecting mirror 39. The beam 33 is also directed to the mirror 39. As a result, the two beams 33 and 37 become superimposed and parallel and may be applied to the system shown in FIG. 1, just as beams 7 and 9 are applied in that system to achieve substantially the same result. It is apparent that the output of a system operating as in FIG. 2 is a signal from a photomultiplier tube at a frequency equal to the shift in frequency caused by the relative motion of the target to the illuminating maser 31.

Other types of masers and suitable material in which the mixing action takes place could be substituted for the ruby masers and potassium vapor described above with reference to FIGS. 1 and 2. For example, the illuminating signal maser 1 and local oscillator maser 8 in FIG. 1 could be $CaF_2$ doped with divalent $Sm^{++}$ emitting 0.71 micron radiation. In this case, the mixing material preferably also includes $CaF_2$ doped with divalent $Sm^{++}$. More particularly, the maser is pumped as shown by the energy level diagram in FIG. 4 by a broad spectrum of radiation which raises the energy level of the Sm to states beyond the diagram. Thereafter, transitions occur to the $5f^5D$ level from which a transition to the $5f^7F$ level occurs accompanied by emission of 0.71 micron radiation. The mixing action occurs in a crystalline material of $CaF_2$ doped with divalent $Sm^{++}$ as shown by the energy level diagram in FIG. 5. Here, the Sm is raised to the $5f^7F$ level by thermal energy. Thereafter, the $f_s$ and $f_{lo}$ radiation at around 0.71 micron which illuminates the mixing crystal raises the energy level of the Sm to one of the $5f^5D$ levels. The population at the $5f^5D$ level will be time varying in accordance with principles of the present invention, and so a radiation $f_o$ at 0.69 micron which accompanies a transition from the $5f^5D$ levels to ground state, will be modulated in intensity at the frequency difference between $f_s$ and $f_{lo}$. Prior to the transition which produces the output $f_o$, there will be a transition from the lower to the higher of the $5f^5D$ levels, and this will be caused by thermal energy. As a result, the final transition producing $f_o$ will be from the upper of the $5f^5D$ levels to the ground state.

Another combination of maser and suitable mixing material is a maser of CaW doped with $ER^{++}O_4^+$ and a mixing material of substantially the same composition. The maser is preferably operated as indicated by the energy level diagram in FIG. 6. It is pumped by a broad spectrum of radiation, denoted white light, to upper levels which extend off the diagram and from which a transition occurs to the $4f^4I$ $13/2$ level. The maser output radiation, $f_s$ or $f_{lo}$ of about 1.61 microns results from a transition from the $4f^4I$ $13/2$ to the $4f^4I$ $15/2$ level. This radiation, $f_s$ and $f_{lo}$, is mixed in the mixing material as indicated by the diagram in FIG. 7. The mixing material is pumped by thermal energy to raise the Er from a ground state to the $4f^4I$ $15/2$ level. Thereafter, the $f_s$ and $f_{lo}$ combine to raise the Er to the $4f^4I$ $13/2$ level and, thus, the population at this level will be time varying at the frequency difference between $f_s$ and $f_{lo}$. Thereafter, a second step of pumping occurs, the energy being provided from, for example, a $R_b$ lamp emitting 0.79 micron radiation which raises the Er from the $4f^4I$ $13/2$ level to a higher level. Here again, the population at the excited levels is time varying at the difference in frequency between $f_s$ and $f_{lo}$, and so a subsequent transition to the ground state produces the output radiation $f_o$ at about 0.52 micron which is of time varying intensity at the same difference frequency.

This concludes the description of specific embodiments of the present invention whereby two frequency signals simultaneously illuminating a chosen material cause transitions in energy level of atoms of the material from one level to another and subsequently another transition occurs producing radiation which varies in intensity at a frequency equal to the frequency difference between the two illuminating signals, and thus the two illuminating signals are mixed and a side band frequency is produced. Specific combinations of masers and mixing materials are described whereby the above phenomenon occurs. However, it is to be clearly understood that the same principles of the invention could be applied in other combinations of masers and mixing materials than those described without deviating from the spirit and scope of the invention as set forth in the accompanying claims.

What is claimed is:

1. A device for mixing two signals comprising:
   maser means for generating each of said signals;
   a material including potassium vapor having at least three energy levels;
   pumping means for raising the energy of said vapor from a first level to a second level;
   means for directing said signals to said material and raising the energy of said vapor from said second level to a third higher level;
   and means for detecting time variations of radiation accompanying transitions between energy states of said atoms of potassium.

2. A device for mixing two frequency signals comprising:
   maser means for generating each of said signals;
   a material including potassium vapor having at least three energy levels;
   pumping means for raising the energy of said vapor from a first level to a second level;
   means for illuminating said material simultaneously with both of said signals and raising the energy of said vapor from said second level to a third higher level;
   and means for detecting time variations in the intensity of radiation of a frequency higher than either of said two frequency signals and which accompanies transitions between energy states of said atoms of potassium.

3. A device for mixing two signals comprising:
   maser means for generating each of said signals;
   a material including potassium vapor having at least three energy levels;
   means for illuminating said potassium vapor simultaneously with both of said signals;
   pumping means for raising the energy level of said potassium from a first level to a second level from which a transition to a third higher level is caused by said illumination;
   and means for detecting time variations in the amount of radiation accompanying an energy state transition of atoms of said third potassium from said higher level.

4. A receiving system for detecting frequency variations of a signal frequency comprising:
   means for generating a frequency varying signal;
   means for generating a local oscillator frequency;
   a mixing system comprising a selected material having at least three energy levels;
   pumping means for raising the energy of said material from a first level to a second level;
   means for simultaneously illuminating said selected material with radiation at said signal and local oscillator frequencies whereby the energy level of atoms of said material are raised from said second level to a third higher level, said signal and local oscillator frequencies not differing by substantially more than the inverse spontaneous natural lifetime of the higher of said energy levels;
   and means for detecting variations of intensity of radiation emitted by said material producing a signal representative of said frequency variations.

5. A receiving system for detecting frequency variations of a signal frequency comprising:
   means for generating a frequency varying signal;
   means for generating a local oscillator frequency;
   a mixing system comprising a selected material having at least three energy levels;
   pumping means for raising the energy of said material from a first level to a second level;
   means for simultaneously illuminating said selected material with radiation at said signal and said local oscillator frequencies whereby thte energy level of atoms of said material is raised from said second level to a third higher level, the difference between said levels being substantially equal to the energy represented by said signal and local oscillator frequencies, and said signal and local oscillator frequencies not differing by substantially more than the inverse spontaneous natural lifetime of the higher of said energy levels;
   and means for detecting variations in the amount of radiation emitted by said material at a frequency substantially higher than either said signal or local oscillator frequencies, said last-mentioned variations occurring at a frequency substantially equal to the difference between said signal and local oscillator frequencies.

6. A receiving system for detecting frequency modulations of a signal frequency comprising:
  means including a ruby maser for generating a frequency modulated signal;
  means including a ruby maser for generating a local oscillator frequency;
  a mixing system comprising a supply of potassium vapor having at least three energy levels;
  pumping means for raising the energy of said vapor from a first level to a second level;
  means for simultaneously directing said modulated signal and local oscillator frequency to said potassium vapor whereby the energy level of atoms of said potassium vapor are raised from said second level to a third higher level, the difference between said levels representing an energy difference substantially equal to the energy represented by said signal and local oscillator frequencies, and the difference between said signal and local oscillator frequencies not being substantially more than the inverse spontaneous natural lifetime of the higher of said energy levels;
  and means for detecting variations of intensity of radiation emitted by said potassium vapor at a frequency substantially higher than either said signal or local oscillator frequencies, said variations of intensity representing said modulations.

7. A device for mixing signals of two different frequencies and for detecting the difference therebetween, comprising:
  maser means for generating each of said signals,
  a mixing system comprising a selected material having at least three energy levels,
  pumping means for raising the energy of said material from a first level to a second level,
  means for directing said signals simultaneously into said mixing system and raising the energy of said material from said second level to a third level,
  and means for detecting radiation from said mixer as a result of photon emission caused by normal decay of energy of said material from said third level.

8. A device as set forth in claim 7 wherein said material is potassium vapor.

References Cited by the Examiner

UNITED STATES PATENTS

| | | | |
|---|---|---|---|
| 2,032,588 | 3/1936 | Miller | 250—199 |
| 3,098,112 | 7/1963 | Horton | 250—199 X |
| 3,154,748 | 10/1964 | Javan et al. | 250—199 X |
| 3,171,031 | 2/1965 | Yariv | 250—199 |
| 3,204,105 | 8/1965 | Robinson | 331—94.5 X |
| 3,211,055 | 10/1965 | Andres | 331—94.5 X |

OTHER REFERENCES

Dulberger et al.: Electronics, Nov. 3, 1961, pp. 40–44.
Harris, Electronics Technology, March 1962, pp. 86–94, p. 94 relied on.

DAVID G. REDINBAUGH, *Primary Examiner.*
JOHN W. CALDWELL, *Examiner.*